No. 675,739. Patented June 4, 1901.
C. F. KANTLEHNER.
DEVICE FOR TESTING EYES.
(Application filed Sept. 24, 1900.)
(No Model.)
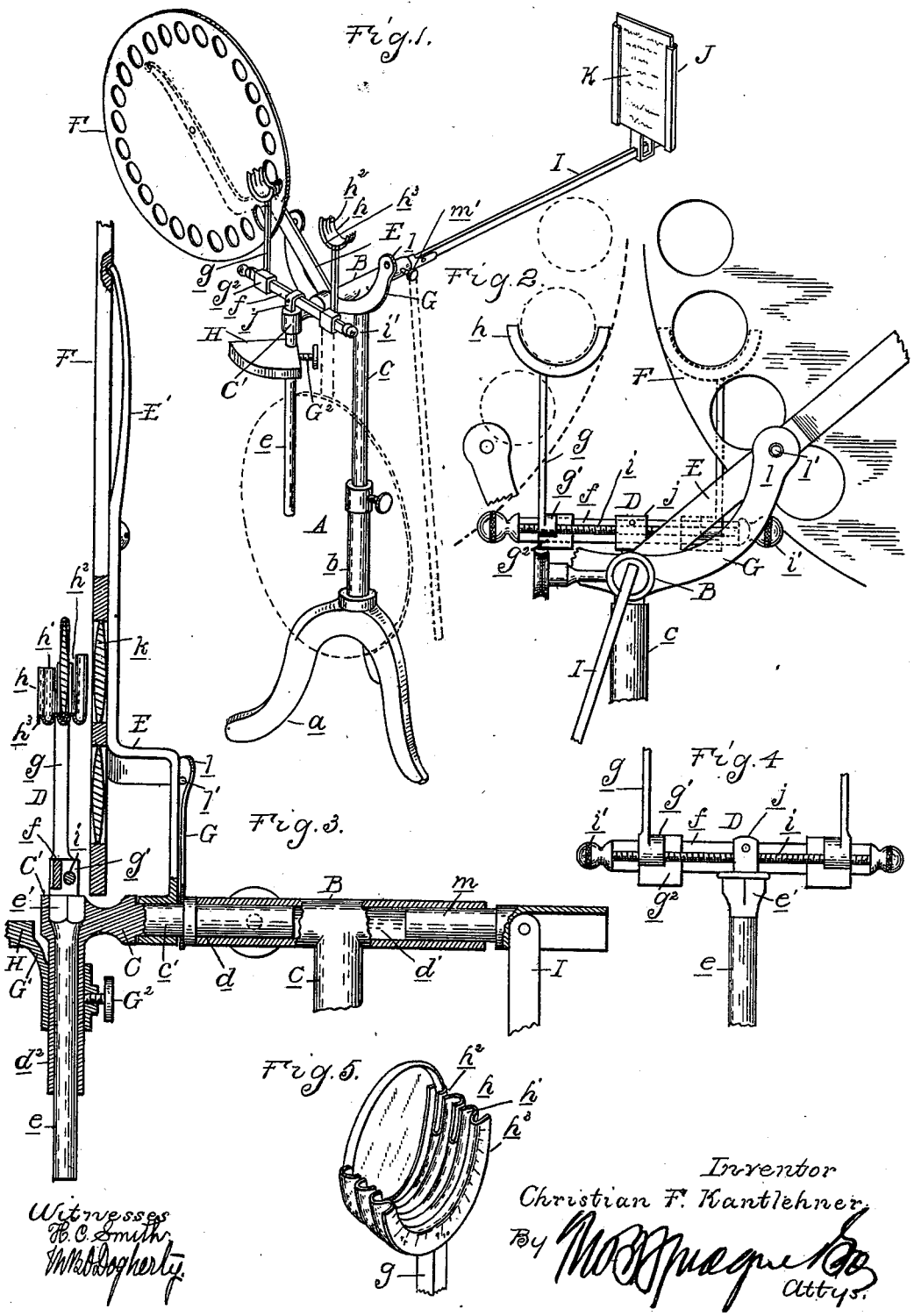
Inventor
Christian F. Kantlehner
Witnesses

UNITED STATES PATENT OFFICE.

CHRISTIAN F. KANTLEHNER, OF CHELSEA, MICHIGAN.

DEVICE FOR TESTING EYES.

SPECIFICATION forming part of Letters Patent No. 675,739, dated June 4, 1901.

Application filed September 24, 1900. Serial No. 30,981. (No model.)

*To all whom it may concern:*

Be it known that I, CHRISTIAN F. KANTLEHNER, a citizen of the United States, residing at Chelsea, in the county of Washtenaw and State of Michigan, have invented certain new and useful Improvements in Devices for Testing Eyes, of which the following is a specification, reference being had therein to the accompanying drawings.

The invention relates to optometers or devices for testing eyes; and it is the object of the invention to obtain an instrument that is capable of being used for a variety of tests which is simple in construction and when not in use may be folded into compact form.

The invention consists in the peculiar construction and arrangement of parts and more particularly to the construction and arrangement of a single rotary lens-holder which is adapted to be used for testing either eye; further, in the peculiar construction of a detachable trial-frame, and, further, in the peculiar construction of the folding standard, all as more fully hereinafter described and claimed.

In the drawings, Figure 1 is a perspective view of the instrument as arranged for use, showing in dotted lines the folded position. Fig. 2 is a rear elevation of a portion of Fig. 1, showing in full lines the rotary lens-holder as arranged for testing the left eye and in dotted lines in the position for testing the right eye. Fig. 3 is a vertical longitudinal section through the upper portion of the instrument. Fig. 4 is an elevation of the trial-frame detached, and Fig. 5 is a perspective view of one of the lens-holding clamps constituting a part of said trial-frame.

A is a standard, which I have shown as comprising a tripod $a$, a central standard $b$, and a telescoping upward extension $c$. At the upper end of this standard is a head, such as B, which supports the detachable trial-frame, the rotary lens-holder, and a rearwardly-extending arm carrying the test-card. As shown, the head B is of T shape, having sockets $d$ and $d'$ at its forward and rear ends.

C is a head having a shank $c'$ adapted to engage with the forward socket D in the head B. At the forward end of the head C is formed a vertical socket $C'$, adapted to receive the shank $e'$ of the trial-frame D. This trial-frame comprises in addition to the shank $e'$ the cross-head $f$, upon which are laterally adjustably secured the arms $g$, carrying at their upper ends the lens-holding clamps $h$, which latter are adapted to receive, respectively, the lens used for testing the right and left eyes of the patient. These holders are preferably formed, as shown in Fig. 5, of sheet metal bent into semicircular form and provided with a series of parallel circumferential corrugations, so as to form a series of parallel grooves $h'$. The metal between the adjacent grooves is slit at the upper end of each side, as shown at $h^2$, thereby forming in cross-section a series of U-shaped bars, severally adapted to receive and clamp the lenses placed therein. The front of each holder is provided with a flange $h^3$, having graduations or markings of degree thereon. The adjusting means for varying the distance between the arms $g$ preferably comprises a right-and-left screw $i$, centrally journaled in the bearing $j$ upon the head $f$ and the opposite ends engaging with threaded bearings $g'$ on sliding heads $g^2$, to which the arms $g$ are secured. The heads $g^2$ slidingly engage with the cross-heads $f$, and the screw $i$ is provided at its opposite ends with milled heads $i'$, so that by turning said milled heads the arms $g$ may be moved either toward or from each other to secure the proper adjustment to the eyes of the patient. The upper end of the shank $e$ is preferably provided with a square or polygonal head $e'$, adapted to engage with the correspondingly-shaped portion of the socket $C'$, so as to hold the frame D in a plane perpendicular to the line of sight.

In rear of the socket $C'$ is pivotally secured to the head C a swinging arm E, which carries at its outer end a rotary disk F. This disk is provided with a circumferential series of apertures adapted in the rotation of the disk to be successively registered with the lens in the holder $h$ of the trial-frame D. In each aperture is placed a spherical lens $k$, and these lenses are preferably graded in strength, one half of the series being suitable for correcting farsightedness and the other half for correcting nearsightedness.

To hold the disk F in proper relation with either of the lens-holders $h$, a suitable lock is provided for the arm E, which is shown as comprising the spring-segments G, having at their outer ends the sockets $l$, with which a pin $l'$ on the arm E is adapted to engage. The arm E is also preferably provided with an extension E', the end of which is adapted to engage with indentations in the holder F to hold the same in different positions of adjustment.

H is a chin-rest which is preferably secured to an arm G, which is sleeved upon an extension $d^2$ of the socket C' and is preferably vertically adjustably secured thereon by a set-screw, as $G^2$. To the rear socket of the head B is secured a shank $m$, to which is hinged an arm I, adapted to extend rearward and carrying the test-card holder J. The shank $m$ is held in the socket by a set-screw $m'$, so that when the instrument is not in use the arm I may be folded to turn in the position shown in dotted lines in Fig. 1. The holder J is slidingly secured to the arm I and has guides for receiving the card K.

The parts being constructed as shown and described, when the instrument is not in use the arm E may be turned downward into the position shown in dotted lines, Fig. 1, and the arm I also turned into the dotted position indicated in that figure. In this position of parts the instrument may be readily packed in a small case. In use the arm E is turned to bring the rotary lens-holder F in operative relation with either one of the holders $h$ of the trial-frame, according to which eye is to be first tested. The operator may then turn the disk F and successively test the eye for distant vision with the different spherical lenses of the holder until one is found which gives the best result. Should it happen that all of the lenses in the holder are too weak for either distant or reading tests, the operator may insert a stronger lens in one of the grooves of the holder $h$ and repeat the test with the combined strength of this stationary lens and the different lenses of the movable holder. When the proper strength of lenses is ascertained, a single lens of corresponding strength is selected by the operator and inserted in the holder $h$, after which the arm E may be turned down and the eye tested for astigmatism, if there be any. After that the arm I may be turned up and the holder J adjusted thereon to bring the test-card K in the proper relation to the eye of the patient, so as to test for near vision. The arm E may then be turned to bring the holder F in the proper relation for testing the other eye of the patient and the operations as above described repeated.

If the patient desires to try the lenses away from the machine, the trial-frame may be detached and may be held by the shank $e$ in proper relation to the eye. The right-and-left screw $i$ forms a means of quickly adjusting the two lens-holders $h$ in relation to each other to fit the eyes of the patient. The holders $h$ are also of a construction which permits of independently clamping each of the lenses inserted therein. This is because of the slots $h^2$ between the parallel grooves $h'$, which permit of the independent clamping action of the U-shaped sections between the slots.

What I claim as my invention is—

1. In a device for testing eyes, the combination of a standard having a socket therein, a lens-holding trial-frame detachably supported in said socket, an arm pivoted to said standard to swing in a plane parallel to said trial-frame, a rotatory holder carried by said arm and having a circumferential series of graded lenses, and means for holding said arm on either side of said trial-frame whereby any one of the lenses in said holder may be registered with the sight-orifice of said frame for testing either eye.

2. In a device for testing eyes, the combination with a standard having a socket therein, a rotary lens-holder supported by said standard and having a circumferential series of graded lenses and a test-card also supported adjustably on said standard, of a lens-holding trial-frame having sight-orifices for two eyes detachably supported in said socket in operative relation to said lens-holder and test-card.

3. A device for testing eyes, comprising a standard a rearwardly-extending arm hinged thereto supporting the test-card, a detachable trial-frame supported at the forward end of said standard, an arm pivoted to swing in a plane parallel to said trial-frame, and a rotatory lens-holder carried by said arm, said swinging arm and folding arm being adapted to be turned into parallelism with said standard, substantially as described.

4. In a device for testing eyes, the combination of a standard, a laterally-extending arm thereon having a vertically-depending socket at its outer end, a detachable trial-frame having a downwardly-extending shank engaging said socket, and a chin-rest vertically adjustably secured upon said depending socket.

5. In a device for testing eyes, a trial-frame having a lens-holder comprising a circumferentially-corrugated segment of sheet metal, slotted between adjacent corrugations to form a plurality of parallel independent lens-clamps.

6. In a device for testing eyes, the combination with a standard and a trial-frame supported thereby having sight-orifices for both eyes and arranged to leave an unobstructed space therebetween for the nose, of a rotatory lens-holder supported by said standard having a circumferential series of graded lenses, and means for shifting said holder from a position to register its lenses in rotation with the sight-orifice for one eye into a corresponding position in relation to the sight-orifice for the other eye said holder being adapted to travel in shifting clear of said nose-space whereby the instrument may be adjusted without change of position of the patient.

7. In a device for testing eyes, the combination with a standard and a trial-frame supported thereby having sight-orifices for both eyes and having a central open space for the nose, of a rotatory lens-holder having a circumferential series of graded lenses, an offset swinging arm to the free end of which said holder is pivoted and means for locking said arm in positions upon opposite sides of said standard, where said rotatory holder is adapted to register its lenses in rotation respectively with the sight-orifices for either eye, and where the circumference of said holder clears said central open space the offset in said arm permitting it to clear said nose-space in swinging.

In testimony whereof I affix my signature in presence of two witnesses.

CHRISTIAN F. KANTLEHNER.

Witnesses:
L. J. WHITTEMORE,
H. C. SMITH.